(12) United States Patent
Simon

(10) Patent No.: US 8,647,499 B2
(45) Date of Patent: Feb. 11, 2014

(54) HYDROCRACKING METHOD USING A MODIFIED ZEOLITE

(75) Inventor: Laurent Simon, Villeurbanne (FR)

(73) Assignee: IFP Energies Nouvelles, Rueil Malmaison Cedex (FR)

( * ) Notice: Subject to any disclaimer, the term of this patent is extended or adjusted under 35 U.S.C. 154(b) by 351 days.

(21) Appl. No.: 12/903,573

(22) Filed: Oct. 13, 2010

(65) Prior Publication Data

US 2011/0083999 A1 Apr. 14, 2011

(30) Foreign Application Priority Data

Oct. 13, 2009 (FR) ..................................... 09 04911

(51) Int. Cl.
*C10G 47/18* (2006.01)
*B01J 29/076* (2006.01)
*B01J 29/064* (2006.01)
*B01J 29/10* (2006.01)
*B01J 29/16* (2006.01)

(52) U.S. Cl.
USPC ........... 208/110; 208/108; 208/217; 208/209; 208/213; 502/103; 502/110

(58) Field of Classification Search
USPC ............. 208/108, 106, 107, 208 R, 209, 213, 208/216 R, 217; 502/60, 63, 64, 66, 79, 102, 502/103, 104, 107, 110
See application file for complete search history.

(56) References Cited

U.S. PATENT DOCUMENTS

| | | | |
|---|---|---|---|
| 3,719,586 A * | 3/1973 | Benner | 208/66 |
| 4,451,572 A | 5/1984 | Cody | |
| 6,171,474 B1 * | 1/2001 | Kasztelan et al. | 208/111.01 |
| 2009/0240008 A1 * | 9/2009 | Simon | 526/108 |

FOREIGN PATENT DOCUMENTS

| | | |
|---|---|---|
| FR | 2 926 086 A1 | 7/2009 |
| FR | 2 926 087 A1 | 7/2009 |
| WO | WO/2007/080240 * | 7/2007 |

OTHER PUBLICATIONS

Search Report of FR 0904911 (Jun. 14, 2010).
E. Klemm et al., "Controlling Acidity and Selectivity of HY-Type Zeolites by Silanation," Journal of Catalysis, vol. 173, No. 1 (1998) pp. 177-186.
S. Lopes Silva et al., "Study of Hydrocracking Catalysts based on Modified USY Zeolites," Instituto Superior Tecnico, XP002586872 (Sep. 30, 2009).

* cited by examiner

*Primary Examiner* — Walter D Griffin
*Assistant Examiner* — Derek Mueller
(74) *Attorney, Agent, or Firm* — Millen, White, Zelano & Branigan, P.C.

(57) ABSTRACT

The present invention describes a method for hydrocracking and/or hydrotreating hydrocarbon-containing feeds using a catalyst comprising at least one hydro-dehydrogenizing metal selected from the group made up of group VIB and non-noble group VIII metals of the periodic table and a support comprising at least one zeolite having at least pore openings containing 12 oxygen atoms, modified by a) at least a stage of introducing at least one alkaline cation belonging to groups IA or IIA of the periodic table, b) a stage of treating said zeolite in the presence of at least one molecular compound containing at least one silicon atom, c) at least one stage of partial exchange of said alkaline cations by $NH_4^+$ cations in such a way that the proportion of alkaline cations remaining in the modified zeolite at the end of stage c) is such that the alkaline cation/aluminum molar ratio ranges between 0.2:1 and 0.01:1, and d) at least one thermal treatment stage.

18 Claims, No Drawings

US 8,647,499 B2

HYDROCRACKING METHOD USING A MODIFIED ZEOLITE

FIELD OF THE INVENTION

The present invention relates to a hydroconversion method and in particular to a hydrocracking and/or hydrotreatment method using a catalyst that comprises an active phase containing at least one hydro-dehydrogenizing element selected from among group VIB and non-noble group VIII elements of the periodic table, alone or in admixture, and a support comprising at least one zeolite modified according to a modification method comprising at least a) a stage of introducing at least one alkaline cation belonging to groups IA or IIA of the periodic table, b) a stage of treating said zeolite in the presence of at least one molecular compound containing at least one silicon atom, c) at least one stage of partial exchange of the alkaline cations by $NH_4^+$ cations in such a way that the proportion of alkaline cations remaining in the modified zeolite at the end of stage c) is such that the alkaline cation/aluminium molar ratio ranges between 0.2:1 and 0.01:1, and d) at least one thermal treatment stage, said zeolite having, prior to being modified, at least one series of channels whose opening is defined by a ring with 12 oxygen atoms (12MR), said catalyst being a sulfide phase catalyst.

In particular, the invention relates to hydrocracking of hydrocarbon-containing feeds that contain for example aromatic and/or olefinic and/or naphthenic and/or paraffinic compounds, to the exclusion of feeds from the Fischer-Tropsch process and possibly containing metals and/or nitrogen and/or oxygen and/or sulfur.

The goal of the hydrocracking process is essentially to produce middle distillates, i.e. a kerosene cut having a boiling point ranging between 150° C. and 250° C., and a diesel cut having a boiling point ranging between 250° C. and 380° C.

BACKGROUND OF THE INVENTION

Hydrocracking heavy petroleum cuts is a very important process in refining that allows to produce, from a surplus of hardly upgradable heavy feeds, lighter fractions such as gasolines, jet fuels and light diesel fuels sought by refiners so as to adjust their production to the structure of the demand. Some hydrocracking processes also allow to obtain a highly purified residue that can provide excellent bases for oils. In relation to catalytic cracking, the interest of catalytic hydrocracking is to provide middle distillates of very good quality. On the other hand, the gasoline produced has a much lower octane number than the gasoline obtained from catalytic cracking.

The flexibility of hydrocracking results from three main elements, i.e. the operating conditions used, the types of catalyst used and the fact that hydrocracking hydrocarbon-containing feeds can be carried out in one or two stages.

The hydrocracking catalysts used in hydrocracking methods are all of bifunctional type, combining an acid function and a hydrogenizing function. The acid function is provided by supports whose surface areas generally range from 150 to 800 $m^2.g^{-1}$ and having a superficial acidity, such as halogenated aluminas (notably chlorinated or fluorinated), combinations of boron and aluminium oxides, amorphous silica-aluminas and zeolites. The hydrogenizing function is provided by either one or more group VIB metals of the periodic table, or by a combination of at least one group VIB metal of the periodic table and at least one group VIII metal.

The balance between the acid and hydrogenizing functions is one of the parameters that govern the activity and selectivity of the catalyst. A weak acid function and a strong hydrogenizing function give weakly active catalysts, operating at a generally high temperature (greater than or equal to 390°-400° C.), and at a low space velocity (the LHSV expressed in volume of feed to be treated per unit volume of catalyst and per hour is generally less than or equal to 2), but exhibiting a very good middle distillate (jet fuels and diesel fuels) selectivity. On the other hand, a strong acid function and a weak hydrogenizing function give active catalysts, but with lower middle distillate selectivities.

A conventional type of hydrocracking catalyst is based on moderately acidic amorphous supports such as silica-aluminas for example. These systems are used to produce good-quality middle distillates and possibly oil bases. These catalysts are for example used in single-stage methods. The drawback of these catalysts based on amorphous supports is their low activity.

Catalysts comprising for example a Y zeolite of FAU structural type, or catalysts comprising for example a zeolite of beta type, have a higher catalytic activity than silica-aluminas, but lower middle distillate (jet fuels and diesel fuels) selectivities. This difference is due to the acid site strength difference on the two types of material.

The modification of zeolites through the deposition of compounds containing at least one molecular compound comprising at least one silicon atom has been widely studied in the past. Examples thereof are, among others, U.S. Pat. No. 4,402,867, which describes a method of preparing a zeolite-based catalyst comprising a stage that consists in depositing in aqueous phase at least 0.3 wt. % amorphous silica in the pores of the zeolite. U.S. Pat. No. 4,996,034 describes a method of substituting aluminium atoms present in a zeolite framework for silicon atoms, said method being carried out in a single stage in an aqueous medium using fluorosilicate salts. U.S. Pat. No. 4,451,572 describes the preparation of a zeolitic catalyst comprising a stage of deposition of organosilicic materials in vapour or liquid phase, the zeolites concerned being wide-pore zeolites, in particular the Y zeolite. The zeolite treated with this method however contains more than 23% alkaline cation Na+ in the structure of the zeolite after modification.

INTEREST OF THE INVENTION

The research work done by the applicant on the modification of many zeolites and crystallized microporous solids and on hydrogenizing active phases have led him to discover that, surprisingly enough, a catalyst for hydrocracking and/or hydrotreating hydrocarbon-containing feeds comprising an active phase that contains at least one hydro-dehydrogenizing element selected from among group VIB and non-noble group VIII elements of the periodic table, alone or in admixture, and a support comprising at least one zeolite having at least one series of channels whose opening is defined by a ring with 12 oxygen atoms (12MR), said zeolite being modified by a) at least one stage of introducing at least one alkaline cation belonging to groups IA or IIA of the periodic table, preferably the Na+ alkaline cation, b) a stage of treating said zeolite in the presence of at least one molecular compound containing at least one silicon atom, c) at least one stage of partial exchange of the alkaline cations by $NH_4^+$ cations, and d) at least one thermal treatment stage, said catalyst being a sulfide phase catalyst and possibly comprising at least one amorphous matrix, possibly at least one doping element in controlled proportion, selected from among phosphorus, boron and silicon, possibly at least one group VB element of the periodic table, and possibly a group VIIA element, allows to obtain a higher activity, i.e. a higher conversion level, for hydrocracking and hydrotreatment of hydrocarbon-containing feeds while allowing to obtain a higher middle distillate (kerosene and diesel fuels) yield and, therefore, to minimize the naphtha yield.

DETAILED DESCRIPTION OF THE CATALYST ACCORDING TO THE INVENTION

According to the invention, the method uses a catalyst comprising an active phase that contains a hydro-dehydrogenizing element selected from among group VIB and non-noble group VIII elements of the periodic table, alone or in admixture, said catalyst being a sulfide phase catalyst.

The Hydrogenizing Phase

Preferably, the group VIB elements of the periodic table are selected from the group made up of tungsten and molybdenum, alone or in admixture. According to a preferred embodiment, the hydro-dehydrogenizing element selected from the group made up of group VIB elements of the periodic table is molybdenum. According to another preferred embodiment, the hydro-dehydrogenizing element selected from the group made up of group VIB elements of the periodic table is tungsten.

Preferably, the non-noble group VIII elements of the periodic table are selected from the group made up of cobalt and nickel, alone or in admixture. According to a preferred embodiment, the hydro-dehydrogenizing element selected from the group made up of non-noble group VIII elements of the periodic table is cobalt. According to another preferred embodiment, the hydro-dehydrogenizing element selected from the group made up of non-noble group VIII elements of the periodic table is nickel.

Preferably, said catalyst comprises at least one group VIB metal in combination with at least one non-noble group VIII metal, the non-noble group VIII elements being selected from the group made up of cobalt and nickel, alone or in admixture, and the group VIB elements being selected from the group made up of tungsten and molybdenum, alone or in admixture.

Advantageously, the following metal combinations are used: nickel-molybdenum, cobalt-molybdenum, nickel-tungsten, cobalt-tungsten, the preferred combinations are: nickel-molybdenum, cobalt-molybdenum, cobalt-tungsten, nickel-tungsten and, more advantageously, nickel-molybdenum and nickel-tungsten.

In cases where the catalyst comprises at least one group VIB metal in combination with at least one non-noble group VIII metal, the proportion of group VIB metal advantageously ranges, in oxide equivalent, between 5 and 40 wt. % in relation to the total mass of said catalyst, preferably between 10 and 35 wt. % and more preferably between 15 and 30 wt. %, and the proportion of non-noble group VIII metal advantageously ranges, in oxide equivalent, between 0.5 and 10 wt. % in relation to the total mass of said catalyst, preferably between 1 and 8 wt. % and more preferably between 1.5 and 6 wt. %.

In cases where the catalyst comprises at least one group VIB metal in combination with at least one non-noble group VIII metal, said catalyst is a sulfide catalyst.

It is also possible to use combinations of three metals, for example nickel-cobalt-molybdenum, nickel-molybdenum-tungsten, nickel-cobalt-tungsten.

Advantageously, the following metal combinations are used: nickel-niobium-molybdenum, cobalt-niobium-molybdenum, nickel-niobium-tungsten, cobalt-niobium-tungsten, the preferred combinations being: nickel-niobium-molybdenum, cobalt-niobium-molybdenum. It is also possible to use combinations of four metals such as, for example, nickel-cobalt-niobium-molybdenum.

The catalyst can also advantageously contain:
0 to 20 wt. %, preferably 0.1 to 15 wt. % and more preferably 0.1 to 10 wt. %, in relation to the total mass of the catalyst, of at least one doping element selected from the group made up of silicon, boron and phosphorus, excluding the silicon contained in the zeolite framework, and possibly
0 to 60 wt. %, preferably 0.1 to 50 wt. % and more preferably 0.1 to 40 wt. %, in relation to the total mass of the catalyst, of at least one element selected from group VB, preferably niobium, and possibly
0 to 20 wt. %, preferably 0.1 to 15 wt. % and more preferably 0.1 to 10 wt. %, in relation to the total mass of the catalyst, of at least one element selected from group VIIA, preferably fluorine.

According to the invention, the catalyst used in the method of the invention comprises a support containing at least one modified zeolite and advantageously a porous mineral matrix of oxide type, said support comprising and being preferably made up of:
0.1 to 99.8 wt. %, preferably 0.1 to 80 wt. %, more preferably 0.1 to 70 wt. % and most preferably 0.1 to 50 wt. % of modified zeolite according to the invention in relation to the total mass of the catalyst,
0.2 to 99.9 wt. %, preferably 20 to 99.9 wt. %, more preferably 30 to 99.9 wt. % and most preferably 50 to 99.9 wt. %, in relation to the total mass of the catalyst, of at least one porous mineral matrix of oxide type.

The Zeolite According to the Invention

According to the invention, the zeolite contained in the support of the catalyst used in the method of the invention comprises at least one series of channels whose opening is defined by a ring with 12 oxygen atoms (12MR) prior to being modified. Said zeolite is selected from among the zeolites defined in the classification "Atlas of Zeolite Structure Types", Ch. Baerlocher, L. B. McCusker, D. H. Olson, $6^{th}$ Edition, Elsevier, 2007, exhibiting at least one series of channels whose pore opening is defined by a ring containing 12 oxygen atoms. The zeolite initially used, prior to being modified, advantageously contains, in addition to at least one series of channels whose pore opening is defined by a ring containing 12 oxygen atoms (12MR), at least one series of channels whose pore opening is defined by a ring containing 8 oxygen atoms (8MR) and/or at least one series of channels whose pore opening is defined by a ring containing 10 oxygen atoms (10MR).

The zeolite can advantageously contain at least another element T, different from silicon and aluminium, integrated in tetrahedral form in the zeolite framework. Preferably, said element T is selected among iron, germanium, boron and titanium, and it represents a weight proportion ranging between 2 and 30% of the constituent atoms of the zeolite framework other than the oxygen atoms. The zeolite then has a (Si+T)/Al atomic ratio ranging between 2 and 200, preferably between 3 and 100 and more preferably between 4 and 80, T being defined as above.

Preferably, the zeolite initially used is a FAU zeolite and, more preferably, the initial zeolite is a Y zeolite.

Said zeolite can be advantageously dealuminized using any means known to the person skilled in the art, so that the framework silicon to aluminium atomic ratio of the zeolite ranges between 2.5 and 200, preferably between 3 and 100 and more preferably between 4 and 80. The Si/Al framework silicon to aluminium atomic ratio of the zeolite is measured by silicon and aluminium NMR according to a method known to the person skilled in the art.

The zeolite of FAU structural type that has undergone one or more dealumination stages and has a three-dimensional network of channels whose opening is defined by a ring with 12 oxygen atoms (12MR) is suitable for implementation of the catalyst used in the method according to the invention. Preferably, the initially used zeolite is a dealuminized FAU zeolite and, more preferably, the initial zeolite is a dealuminized Y zeolite.

Method of Modifying the Zeolite Contained in the Catalyst Support Used in the Method According to the Invention According to the invention, the zeolite contained in the catalyst support used in the method of the invention, which initially exhibits, prior to being modified, at least one series of channels whose opening is defined by a ring with 12 oxygen atoms, preferably the dealuminized Y zeolite, is modified by a) a stage of introducing at least one alkaline cation belonging to groups IA or IIA of the periodic table, b) a stage of treating said zeolite in the presence of at least one molecular compound containing at least one silicon atom, c) at least one stage of partial exchange of the alkaline cations by $NH_4^+$ cations, and d) at least one thermal treatment stage.

Said initial zeolite is thus modified according to a modification method comprising at least one stage of a) introducing at least one alkaline cation belonging to groups IA and IIA of the periodic table, said cation(s) being preferably selected from among the following cations: $Na^+$, $Li^+$, $K^+$, $Rb^+$, $Cs^+$, $Ba^{2+}$ and $Ca^{2+}$, and more preferably said cation being the $Na^+$ cation. This stage can be carried out using any method known to the person skilled in the art, and this stage is preferably carried out using the method known as ion exchange.

At the end of stage a) of the modification method, the zeolite contained in the catalyst support used in the method according to the invention is in cationic form.

The method of modifying said zeolite then comprises a treatment stage b) in the presence of at least one molecular compound containing at least one silicon atom. This stage is referred to as stage of selectivation of said zeolite. What is understood by "selectivation", in the sense of the present invention, is the neutralization of the acidity of each crystal of the cationic zeolite. Acidity neutralization can be performed using any method known to the person skilled in the art. Conventional methods generally use molecular compounds containing atoms that can interact with the sites of the zeolite crystals. The molecular compounds used within the scope of the invention are organic or inorganic molecular compounds containing one or more silicon atom(s).

Thus, according to treatment stage b), the cationic zeolite prepared according to stage a) is subjected to a treatment stage in the presence of at least one molecular compound containing at least one silicon atom. Said stage b) allows deposition of a layer of said molecular compound containing at least one silicon atom at the surface of the zeolite crystals, which is converted after stage c) to a layer of amorphous silica at the surface of each zeolite crystal.

Preferably, the molecular compound containing at least one silicon atom is selected from among the compounds of formula Si—$R_4$ and $Si_2$—$R_6$ where R is selected among hydrogen, an alkyl, aryl acyl group, an alkoxy group (O—R'), a hydroxyl group (—OH) or a halogen, preferably an alkoxy group (O—R'). Within a single Si—$R_4$ or $Si_2$—$R_6$ molecule, group R can advantageously be either identical or different. Preferably, the molecular compound is selected among the compounds of formula $Si_2H_6$ or $Si(C_2H_5)_3(CH_3)$. Thus, the molecular compound containing at least one silicon atom used in stage b) of the method according to the invention can advantageously be a compound of silane, disilane, alkylsilane, alkoxysilane or siloxane type.

Said molecular compound used for carrying out stage b) of the invention preferably comprises at most two silicon atoms per molecule.

More preferably, said molecular compound has a composition of general formula Si—$(OR')_4$ where R' is an alkyl, aryl or acyl group, preferably an alkyl group, and more preferably an ethyl group.

Most preferably, the molecular compound containing at least one silicon atom is the molecular compound tetraethylorthosilicate (TEOS) of formula $Si(OCH_2CH_3)_4$.

Said stage b) of the modification method that consists in treating the cationic zeolite exchanged according to stage a) in the presence of at least one molecular compound containing at least one silicon atom is advantageously carried out by deposition of said compound on the inner and outer surfaces of the zeolite. Chemical vapour deposition (CVD) or chemical liquid deposition (CLD) can be performed according to any method known to the person skilled in the art. Said stage b) is preferably carried out by chemical liquid deposition of said molecular compound containing at least one silicon atom.

If stage b) of the modification method is achieved using chemical vapour deposition (CVD), it is advantageously carried out in a fixed-bed reactor. Prior to the chemical vapour deposition reaction in said fixed-bed reactor, the zeolite is preferably activated. Activation of the zeolite in the fixed-bed reactor is performed under oxygen, air or an inert gas, or under a mixture of air and inert gas or of oxygen and inert gas. The zeolite activation temperature advantageously ranges between 100° C. and 600° C., more advantageously between 300° C. and 550° C. The molecular compound containing at least one silicon atom to be deposited on the outer surface of each crystal of the zeolite is sent to the reactor in vapour phase, said molecular compound being diluted in a carrier gas that can be either hydrogen ($H_2$), or air, or argon (Ar), or helium (He, or nitrogen ($N_2$), and the carrier gas is preferably an inert gas selected from among Ar, He and $N_2$. Said molecular compound containing at least one silicon atom is deposited on the outer surface of said zeolite in vapour phase. In order to obtain an amorphous silica layer of optimum quality on the outer surface of the zeolite at the end of stage c), it is necessary to properly select the operating conditions for deposition of the molecular compound containing at least one silicon atom. In particular, the temperature of the zeolite bed during deposition preferably ranges between 10° C. and 300° C., more preferably between 50° C. and 200° C., the partial pressure, in the gas phase, of the molecular compound to be deposited on the outer surface of the zeolite preferably ranges between 0.001 and 0.5 bar, more preferably between 0.01 and 0.2 bar, the deposition time preferably ranges between 10 minutes and 10 hours, more preferably between 30 minutes and 5 hours, and most preferably between 1 hour and 3 hours.

If stage b) of the modification method is carried out by chemical liquid deposition (CLD), it is advantageously performed under stirring. Chemical liquid deposition can be done either in an aqueous medium or in an organic solvent. During impregnation in an aqueous medium of the molecular compound containing at least one silicon atom, it is possible to add or not one or more surfactant(s) to the impregnation solution. Chemical liquid deposition is well known to the person skilled in the art (Chon et al., Studies in Surface Science and Catalysis, Vol. 105, 2059-2065, 1997). Preferably, said molecular compound containing at least one silicon atom is deposited on the outer surface of said zeolite in an anhydrous organic solvent. The organic solvent is advantageously selected from among the saturated or unsaturated molecules containing 5 to 10 carbon atoms, preferably 6 to 8 carbon atoms. In order to obtain an amorphous silica layer of optimum quality on the outer surface of the zeolite at the end of stage c), it is necessary to properly select the operating conditions for deposition of the molecular compound containing at least one silicon atom. In particular, the temperature of the organic solvent solution preferably ranges between 10° C. and 100° C., more preferably between 30° C. and 90° C. The proportion of silica added to the anhydrous solvent solution advantageously ranges between 0.0001 and 5 wt. %, preferably between 0.0001 and 2 wt. %, and more preferably between 0.0005 and 1 wt. % in relation to the proportion of zeolite. The deposition time preferably ranges between 5 minutes and 10 hours, more preferably between 30 minutes and 5 hours, and most preferably between 1 hour and 3 hours.

The zeolite modification method then comprises a stage c) corresponding to at least one partial exchange of the alkaline cations belonging to groups IA and IIA of the periodic table, introduced in stage a), and preferably of the $Na^+$ cations by $NH_4^+$ cations. What is understood by partial exchange of the alkaline cations and preferably of the $Na^+$ cations by $NH_4^+$ cations is the exchange of 80 to 99%, preferably 80 to 98.5%, more preferably 85 to 98% and most preferably 90 to 98% of the alkaline cations, preferably $Na^+$ cations, by $NH_4^+$ cations. The amount of alkaline cations remaining, preferably the amount of $Na^+$ cations remaining in the modified zeolite, in relation to the amount of $NH_4^+$ cations initially present in the zeolite, advantageously ranges between 1 and 20%, preferably between 1.5 and 20%, more preferably between 2 and 15%, and most preferably between 2 and 10%.

Preferably, for this stage, several ionic exchanges are carried out with a solution containing at least one ammonium salt selected from among chlorate, sulfate, nitrate, phosphate salts, or ammonium acetate, so as to remove at least partly the alkaline cations and preferably the $Na^+$ cations present in the zeolite. Preferably, the ammonium salt is ammonium nitrate NH4NO3.

Thus, according to the invention, the proportion of alkaline cations remaining, preferably of $Na^+$ cations remaining in the modified zeolite at the end of stage c) is preferably such that the alkaline cation/aluminium molar ratio, preferably the Na/Al molar ratio, ranges between 0.2:1 and 0.01:1, preferably between 0.2:1 and 0.015:1, more preferably between 0.15:1 and 0.02:1, and most preferably between 0.1:1 and 0.02:1.

The desired Na/Al ratio is obtained by adjusting the $NH_4^+$ concentration of the cationic exchange solution, the cationic exchange temperature and the number of cationic exchanges. The $NH_4^+$ concentration of the solution advantageously ranges between 0.01 and 12 mol/l, preferably between 1 and 10 mol/l. The temperature of the exchange stage advantageously ranges between 20° C. and 100° C., preferably between 60° C. and 95° C., more preferably between 60° C. and 90° C., more preferably yet between 60° C. and 85° C., and most preferably between 60° C. and 80° C. The number of ionic exchanges advantageously ranges between 1 and 10, preferably between 1 and 4.

Maintaining a controlled proportion of alkaline cations, preferably $Na^+$ cations, instead of protons allows to neutralize the most acid Brønsted and Lewis sites of the zeolite, which decreases the secondary cracking of the middle distillate molecules to gasoline during hydrocracking reactions. This effect allows to obtain a middle distillate selectivity gain. If the amount of alkaline cations, preferably of $Na^+$ cations, remaining in the structure of the modified zeolite is too large, the number of Brønsted acid sites decreases too much, which generates a catalyst activity loss.

The zeolite modification method then comprises at least one thermal treatment stage d). This thermal treatment allows both decomposition of the molecular compound containing at least one silicon atom deposited on the zeolite at the end of stage b) and conversion of the $NH_4^+$ cations partly exchanged at the end of stage c) to protons. The thermal treatment according to the invention is carried out at a temperature preferably ranging between 200° C. and 700° C., more preferably between 300° C. and 500° C. Said thermal treatment stage is advantageously carried out under air, oxygen, hydrogen, nitrogen or argon, or under a mixture of nitrogen and argon. This treatment advantageously lasts between 1 hour and 5 hours. At the end of said thermal treatment stage d), an amorphous silica layer is deposited on the surface of each zeolite crystal and the protons of the zeolite are partly regenerated.

The Amorphous or Ill-Crystallized Porous Mineral Matrix of Oxide Type

The catalyst support used in the hydrocracking and/or hydrotreatment method according to the invention advantageously contains a porous mineral matrix, preferably amorphous, which advantageously consists of at least one refractory oxide. Said matrix is advantageously selected from the group made up of alumina, silica, clays, titanium oxide, boron oxide and zirconia. The matrix can consist of a mixture of at least two of the aforementioned oxides, preferably silica-alumina. Aluminates can also be selected. Matrices containing alumina, in any form known to the person skilled in the art, for example gamma alumina, are preferably used.

Mixtures of alumina and of silica, of alumina and silica-alumina, can also be advantageously used.

Catalyst Preparation

The modified zeolite can come, without this example being limitative, in form of powder, crushed powder, suspension, suspension subjected to a deagglomeration treatment. Thus, for example, the modified zeolite can be advantageously passed into a suspension, acidulated or not, at a concentration adjusted to the desired final zeolite content on the support. This suspension, commonly referred to as slip, is then advantageously mixed with the precursors of the matrix.

According to a preferred embodiment, the modified zeolite can be advantageously introduced while shaping the support with the elements that make up the matrix. For example, according to this preferred embodiment of the present invention, the modified zeolite according to the invention is added to a wet alumina gel during the support shaping stage.

A preferred method of shaping the support of the present invention consists in kneading at least one modified zeolite with a wet alumina gel for several ten minutes, then in passing the dough thus obtained through a die so as to form extrudates of diameter ranging between 0.4 and 4 mm.

According to another preferred embodiment, the modified zeolite can be introduced during synthesis of the matrix. For example, according to this preferred embodiment of the present invention, the modified zeolite is added during synthesis of the silico-aluminic matrix. The zeolite can be added to a mixture consisting of an alumina compound in an acidic medium with a totally soluble silica compound.

The support can be shaped using any technique known to the person skilled in the art. Shaping can be carried out for example by extrusion, pelletizing, by means of the oil drop method, rotary plate granulation or any other method known to the person skilled in the art.

At least one calcination can be conducted after any one of the preparation stages. The calcination treatment is usually carried out under air at a temperature of at least 150° C., preferably at least 300° C., more preferably between about 350° C. and 1000° C.

The group VIB elements and/or the non-noble group VIII elements, possibly the doping elements selected among phosphorus, boron, silicon and optionally the groups VB and VIIA elements can be introduced, all or part thereof, at any stage of the preparation, during synthesis of the matrix, preferably while shaping the support or, more preferably, after shaping the support by means of any method known to the person skilled in the art. They can be introduced after shaping the support, and after or before drying and calcination of the support.

According to a preferred embodiment of the present invention, all or part of the group VIB elements and/or the non-noble group VIII elements, possibly the doping elements selected among phosphorus, boron, silicon and optionally the groups VB and VIIA elements can be introduced while shaping the support, for example during the stage of kneading the modified zeolite with a wet alumina gel.

According to another preferred embodiment of the present invention, all or part of the group VIB elements and/or the non-noble group VIII elements, possibly the doping elements selected among phosphorus, boron, silicon and optionally the groups VB and VIIA elements can be introduced by means of one or more operations of impregnation of the shaped and calcined support, with a solution containing the precursors of these elements. Preferably, the support is impregnated with an aqueous solution. Impregnation of the support is preferably carried out using the impregnation method referred to as "dry" method, known to the person skilled in the art.

In cases where the catalyst of the present invention contains a non-noble group VIII metal, the group VIII metals are preferably introduced by means of one or more operations of impregnation of the shaped and calcined support, after the group VIB metals or simultaneously therewith.

According to another preferred embodiment of the present invention, boron and silicon deposition can also be achieved simultaneously by using, for example, a solution containing a boron salt and a silicon compound of silicone type.

Impregnation of the group VB elements, preferably niobium, can be advantageously facilitated by adding oxalic acid and optionally ammonium oxalate to the niobium oxalate solutions. Other compounds can be used to improve the solubility and facilitate the impregnation of niobium, as it is known to the person skilled in the art.

When at least one doping element, P and/or B and/or Si, is introduced, its distribution and location can be determined by means of techniques such as the EPMA probe (distribution profile of the various elements), transmission electron microscopy coupled to X-ray analysis of the catalyst constituents, or by mapping the distribution of the elements present in the catalyst by means of an electron microprobe.

For example, among the molybdenum and tungsten sources, it is possible to use molybdic and tungstic oxides, hydroxides and acids, as well as their salts, in particular ammonium salts such as ammonium molybdate, ammonium heptamolybdate, ammonium tungstate, phosphomolybdic acid, phosphotungstic acid and their salts, silicomolybdic acid, silicotungstic acid and their salts. Ammonium oxides and salts such as ammonium molybdate, ammonium heptamolybdate and ammonium tungstate are preferably used.

The sources of non-noble group VIII elements that can be used are known to the person skilled in the art. For example, for non-noble metals, nitrates, sulfates, hydroxides, phosphates, halogenides such as, for example, chlorides, bromides and fluorides, carboxylates such as, for example, acetates and carbonates, are used.

The preferred phosphorus source is orthophosphoric acid $H_3PO_4$, but its salts and esters such as ammonium phosphates are also suitable. Phosphorus can for example be introduced in form of a mixture of phosphoric acid and a basic organic compound containing nitrogen, such as ammonia, primary and secondary amines, cyclic amines, compounds of the pyridine and quinoline family, and compounds of the pyrrole family. Tungsto-phosphoric or tungsto-molybdic acids can be used.

The phosphorus content is adjusted, without limiting the scope of the invention, so as to form a mixed compound in solution and/or on the support, for example tungsten-phosphorus or molybdenum-tungsten-phosphorus. These mixed compounds can be heteropolyanions. These compounds can be Anderson heteropolyanions for example.

The boron source can be boric acid, preferably orthoboric acid $H_3BO_3$, ammonium biborate or pentaborate, boron oxide, boric esters. The boron can for example be introduced in form of a mixture of boric acid, oxygenated water and a basic organic compound containing nitrogen, such as ammonia, primary and secondary amines, cyclic amines, compounds of the pyridine and quinoline family, and compounds of the pyrrole family. The boron can be introduced for example by a solution of boric acid in a water/alcohol mixture.

Many silicon sources can be used. Thus, it is possible to use ethyl orthosilicate $Si(OEt)_4$, siloxanes, polysiloxanes, silicones, silicone emulsions, halogenide silicates such as ammonium fluorosilicate $(NH_4)_2SiF_6$ or sodium fluorosilicate $Na_2SiF_6$. Silicomolybdic acid and its salts, silicotungstic acid and its salts can also be advantageously used. The silicon can for example be added by impregnation of ethyl silicate in solution in a water/alcohol mixture. The silicon can be added for example by impregnation of a silicon compound of silicone type or silicic acid in suspension in water.

The group VB element sources that can be used are known to the person skilled in the art. For example, niobium sources such as oxides can be mentioned, like diniobium pentaoxide $Nb_2O_5$, niobium hydroxides and polyoxoniobates, niobium alkoxides of formula $Nb(OR1)_3$ where R1 is an alkyl radical, niobium oxalate $NbO(HC_2O_4)_5$, ammonium niobate. Niobium oxalate or ammonium niobate are preferably used.

The group VIIA element sources that can be used are known to the person skilled in the art. For example, the fluoride anions can be introduced in form of fluorhydric acid or its salts. These salts are formed with alkaline metals, ammonium or an organic compound. In the latter case, the salt is advantageously formed in the reaction mixture by reaction between the organic compound and the fluorhydric acid. It is also possible to use hydrolyzable compounds that can release fluoride anions in water, such as ammonium fluorosilicate $(NH_4)_2SiF_6$, silicon tetrafluoride $SiF_4$ or sodium tetrafluoride $Na_2SiF_6$. The fluorine can be introduced for example by impregnation of an aqueous solution of fluorhydric acid or ammonium fluoride.

The catalysts used in the method according to the invention advantageously come in form of spheres or extrudates. It is however advantageous for the catalyst to come in form of extrudates of diameter ranging between 0.5 and 5 mm, more particularly between 0.7 and 2.5 mm. The shapes are cylindrical (hollow or not), twisted cylindrical, multilobe (2, 3, 4 or 5 lobes for example), rings. The cylindrical shape is preferably used, but any other shape can be used. The catalysts according to the invention can optionally be produced and used in form of crushed powder, tablets, rings, balls, wheels.

According to the invention, the group VIB and/or group VIII metals of said catalyst are present in sulfide form, the sulfurization treatment being described further below.

The invention also relates to a method of hydrocracking hydrocarbon-containing feeds with said catalysts.

Characterization Techniques

The amount of alkaline cation belonging to groups IA or IIA of the periodic table and preferably the amount of alkaline cation $Na^+$ remaining in the modified zeolite after the modification treatment described above is measured by atomic adsorption according to a method known to the person skilled in the art.

The Lewis and Brønsted acidity of the zeolites is measured by pyridine adsorption, followed by infrared spectroscopy (FTIR). Integration of the characteristic bands of the coordinated pyridine at 1455 $cm^{-1}$ and of the protonated pyridine at 1545 $cm^{-1}$ allows to compare the relative acidity of the Lewis and Brønsted type catalysts respectively. Before adsorption of the pyridine, the zeolite is pretreated under secondary vacuum at 450° C. for 10 h with an intermediate stage at 150° C. for 1 h. The pyridine is then adsorbed at 150° C. and desorbed under secondary vacuum at the same temperature before recording the spectra.

Hydrocracking and Hydrotreatment Methods

The invention relates to a hydroconversion method, in particular a hydrocracking method, and to a method of hydrotreating hydrocarbon-containing feeds using the catalyst described above.

More particularly, the invention relates to a hydrocracking and/or hydrotreatment method operating in the presence of hydrogen, at a temperature above 200° C., at a pressure above 1 MPa, the space velocity ranging between 0.1 and 20 $h^{-1}$, and the amount of hydrogen introduced is such that the volume ratio of liter of hydrogen to liter of hydrocarbon ranges between 80 and 5000 l/l.

Preferably, the hydrocracking method according to the invention operates in the presence of hydrogen, at a temperature above 200° C., preferably ranging between 250° C. and 480° C., more preferably between 320° C. and 450° C., most preferably between 330° C. and 435° C., at a pressure above 1 MPa, preferably ranging between 2 and 25 MPa, more preferably between 3 and 20 MPa, at a space velocity ranging between 0.1 and 20 $h^{-1}$, preferably between 0.1 and 6 $h^{-1}$, more preferably between 0.2 and 3 $h^{-1}$, and the amount of hydrogen introduced is such that the volume ratio of liter of hydrogen to liter of hydrocarbon ranges between 80 and 5000 l/l, most often between 100 and 2000 l/l.

These operating conditions used in the methods according to the invention generally allow to reach conversions per pass, in products having boiling points below 340° C. and, even better, below 370° C., above 15 wt. % and, more preferably, ranging between 20 and 95 wt. %.

The invention also relates to a method of hydrotreating hydrocarbon-containing feeds using the catalyst described above, and said hydrotreatment method can be advantageously used alone or upstream from a hydrocracking method. Said hydrotreatment method is described below.

Feeds

Very varied feeds can be treated by the methods according to the invention as described above. They advantageously contain at least 20 vol. % and preferably at least 80 vol. % compounds boiling above 340° C.

The feed is advantageously selected from among LCOs (Light Cycle Oils from a catalytic cracking unit), atmospheric distillates, vacuum distillates such as, for example, gas oils from straight crude oil distillation or from conversion units such as FCC, coker or visbreaking, feeds from lube oil base aromatics extraction units or from lube oil base solvent-dewaxing, distillates from ATR (atmospheric residues) and/or VR (vacuum residues) and/or deasphalted oil fixed-bed or ebullated-bed desulfurization or hydroconversion processes, and deasphalted oils, alone or in admixture. The above list is not limitative. Paraffins from the Fischer-Tropsch process are excluded. Said feeds preferably have a boiling point T5 above 340° C., preferably above 370° C., i.e. 95% of the compounds present in the feed have a boiling point above 340° C., and preferably above 370° C.

The nitrogen content of the feeds treated in the methods according to the invention is advantageously above 500 wt.-ppm. It preferably ranges between 500 and 10000 wt.-ppm, more preferably between 700 and 4000 wt.-ppm and most preferably between 1000 and 4000 wt.-ppm. The sulfur content of the feeds treated in the methods according to the invention advantageously ranges between 0.01 and 5 wt. %, preferably between 0.2 and 4 wt. % and more preferably between 0.5 and 3 wt. %.

The feed possibly contains metals. The cumulative nickel and vanadium content of the feeds treated in the methods according to the invention is preferably below 1 wt.-ppm.

The feed possibly contains asphaltenes. The asphaltene content is generally below 3000 wt.-ppm, preferably below 1000 wt.-ppm and more preferably below 200 wt.-ppm.

Catalysts Sulfurization

According to the invention and prior to injection of the feed, the catalysts used in the methods of the present invention are first subjected to a sulfurization treatment allowing to convert, at least partly, the metallic species to sulfide prior to contacting them with the feed to be treated. This activation treatment through sulfurization is well known to the person skilled in the art and it can be carried out using any method already described in the literature, either in situ, i.e. in the reactor, or ex situ.

A conventional sulfurization method known to the person skilled in the art consists in heating the catalyst in the presence of hydrogen sulfide (pure or, for example, in a stream of a hydrogen/hydrogen sulfide mixture) at a temperature ranging between 150° C. and 800° C., preferably between 250° C. and 600° C., generally in a traversed-bed reaction zone.

Guard Beds

In cases where the feed contains compounds of resin and/or asphaltene type, it is advantageous to first pass the feed through a catalyst or adsorbent bed different from the hydrocracking or hydrotreatment catalyst. The guard catalysts or beds used according to the invention come in form of spheres or extrudates. It is however advantageous for the catalyst to come in form of extrudates of diameter ranging between 0.5 and 5 mm, more particularly between 0.7 and 2.5 mm. The shapes are cylindrical (hollow or not), twisted cylindrical, multilobe (2, 3, 4 or 5 lobes for example), rings. The cylindrical shape is preferably used, but any other shape can be used.

In order to overcome the presence of contaminants or poisons in the feed, the guard catalysts can, in another preferred embodiment, have more particular geometrical shapes in order to increase their void fraction. The void fraction of these catalysts ranges between 0.2 and 0.75. Their outside diameter can range between 1 and 35 mm. Non limitative examples of possible particular shapes are: hollow cylinders, hollow rings, Raschig rings, indented hollow cylinders, castellated hollow cylinders, pentaring wagon wheels, multi-hole cylinders, etc.

These guard catalysts or beds may have been impregnated with an active phase or not. Preferably, the catalysts are impregnated with a hydro-dehydrogenizing phase. More preferably, the CoMo or NiMo phase is used.

These guard catalysts or beds can exhibit macroporosity. The guard beds can be marketed by Norton-Saint-Gobain, for example the MacroTrap® guard beds. The guard beds can be marketed by Axens in the ACT family: ACT077, ACT645, ACT961 or HMC841, HMC845, HMC868 or HMC945. It can be particularly advantageous to superpose these catalysts in at least two different beds of variable height. The catalysts having the highest void fraction are preferably used in the first catalytic bed(s) at the catalytic reactor inlet. It can also be advantageous to use a least two different reactors for these catalysts.

The preferred guard beds according to the invention are the HMCs and ACT961.

Embodiments

The hydrocracking methods according to the invention that use the catalysts described above cover pressure and conversion ranges from mild hydrocracking to high-pressure hydrocracking. What is referred to as mild hydrocracking is hydrocracking leading to moderate conversions, generally below 40%, and operating at low pressure, generally between 2 MPa and 6 MPa.

The hydrocracking methods according to the invention can advantageously use said catalyst described above alone, in one or more fixed-bed catalytic beds, in one or more reactors, in a hydrocracking scheme referred to as single-stage scheme, with or without liquid recycle of the non-converted fraction, optionally in combination with a conventional hydrotreatment catalyst arranged upstream from the catalyst used in the method according to the present invention.

The hydrocracking methods according to the invention can also advantageously use said catalyst described above alone, in one or more ebullated-bed reactors, in a hydrocracking scheme referred to as single-stage scheme, with or without liquid recycle of the non-converted fraction, optionally in combination with a conventional hydrotreatment catalyst arranged in a fixed-bed or ebullated-bed reactor upstream from the catalyst used in the method according to the present invention.

The ebullated bed operates with used catalyst removal and daily addition of new catalyst in order to maintain a stable catalyst activity.

The catalyst described according to the invention can also be advantageously used in the first hydrotreatment reaction zone, in converting pretreatment, alone or in combination with another conventional hydrorefining catalyst, arranged upstream from the catalyst described according to the invention, in one or more catalytic bed(s), in one or more fixed-bed or ebullated-bed reactor(s).

Single-Stage Method

The hydrocracking method according to the invention can be advantageously used in a method referred to as single-stage method.

Single-stage hydrocracking first comprises, in general terms, deep hydrorefining whose goal is to achieve deep hydrodenitrogenation and desulfurization of the feed before it is sent onto the hydrocracking catalyst proper, in particular if the latter comprises a zeolite. This deep feed hydrorefining only causes limited conversion of the feed to lighter fractions, which remains insufficient and therefore has to be completed on the more active hydrocracking catalyst described above. However, it can be noted that no separation occurs between the two types of catalyst. All of the effluent at the reactor outlet is injected onto said hydrocracking catalyst proper, and only then does a separation of the products formed take place. This hydrocracking version, also called once-through hydrocracking method, has a variant with recycle of the non-converted fraction to the reactor for deeper conversion of the feed.

The catalyst described according to the invention is therefore advantageously used in a single-stage hydrocracking method, in a hydrocracking zone arranged downstream from a hydrorefining zone, no intermediate separation being provided between the two zones.

Preferably, the hydrorefining catalyst used in the first hydrorefining reaction zone, alone or in combination with another conventional hydrorefining catalyst, arranged upstream from the catalyst described according to the invention, is a catalyst optionally comprising a doping element selected from among phosphorus, boron and silicon, said catalyst being based on non-noble group VIII elements, and possibly in combination with group VIB elements on alumina or silica-alumina support, and more preferably said catalyst comprises nickel and tungsten.

The catalyst described according to the invention can also be advantageously used in the first hydrorefining reaction zone, in converting pretreatment, alone or in combination with another conventional hydrorefining catalyst, arranged upstream from the catalyst described according to the invention, in one or more catalytic bed(s), in one or more reactor(s).

Fixed-Bed Single-Stage Method with Intermediate Separation

The hydrocracking method according to the invention can be advantageously implemented in a fixed-bed single-stage method with intermediate separation.

Said method advantageously comprises a hydrorefining zone, a zone allowing partial ammonia removal, for example through a hot flash, and a hydrocracking zone wherein said hydrocracking catalyst according to the invention is used. This method of hydrocracking hydrocarbon feeds in a single stage for middle distillates and possibly oil bases production advantageously comprises at least a first hydrorefining reaction zone, and at least a second reaction zone wherein hydrocracking of at least part of the effluent from the first reaction zone is carried out. This method also advantageously comprises incomplete separation of the ammonia from the effluent leaving the first zone. This separation is advantageously performed by means of an intermediate hot flash. The hydrocracking operation carried out in the second reaction zone is advantageously performed in the presence of ammonia, in a lower proportion than the amount present in the feed, preferably below 1500 wt.-ppm, more preferably below 1000 wt.-ppm and most preferably below 800 wt.-ppm.

The catalyst described according to the invention can also be advantageously used in the first hydrorefining reaction zone, in converting pretreatment, alone or in combination with another conventional hydrorefining catalyst, arranged upstream from the catalyst described according to the invention, in one or more catalytic bed(s), in one or more reactor(s).

Two-Stage Method

The hydrocracking method according to the invention can be advantageously implemented in two stages.

Two-stage hydrocracking advantageously comprises a first stage whose goal is, as in the single-stage method, to carry out hydrorefining of the feed, but also to reach a conversion thereof generally of the order of 40 to 60%. The effluent resulting from the first hydrocracking stage then advantageously undergoes a separation, preferably a distillation, most often referred to as intermediate separation, whose goal is to separate the conversion products from the non-converted fraction. In the second stage of a two-stage hydrocracking method, only the fraction of the feed that has not been converted during the first hydrocracking stage is treated. Said catalyst described according to the invention is advantageously used in the second hydrocracking stage of said two-stage hydrocracking method. Intermediate separation allows a two-stage hydrocracking method to be more selective towards middle distillates (kerosene+diesel) than a single-stage method. In fact, intermediate separation of the conversion products prevents "over-cracking" thereof to naphtha and gas in the second stage on the hydrocracking catalyst. Besides, it can be noted that the non-converted fraction of the feed treated in the second stage generally contains very small amounts of NH3 and organic nitrogen-containing compounds, generally less than 20 wt.-ppm, or even less than 10 wt.-ppm.

The fixed-bed or ebullated-bed catalytic bed configurations described in the case of a single-stage method can be advantageously used in the first or in the second hydrocracking stage of a two-stage scheme, whether the catalyst according to the invention is used alone or in combination with a conventional hydrorefining catalyst arranged upstream from the first hydrocracking stage.

The catalyst described according to the invention is thus advantageously used in a two-stage hydrocracking method, in the second hydrocracking stage downstream from the first hydrocracking stage, an intermediate separation being provided between the two zones.

For the single-stage methods and for the first hydrorefining stage of the two-stage hydrocracking methods, the conventional hydrorefining catalysts that can be advantageously used are catalysts possibly containing a doping element selected among phosphorus, boron and silicon, said catalyst being based on non-noble group VIII elements and optionally in combination with group VIB elements on alumina, silica-alumina or zeolite support, and more preferably said catalyst comprises nickel and tungsten, or nickel and molybdenum.

The first hydrorefining stage of the single-stage hydrocracking methods and of the two-stage hydrocracking methods can advantageously use one or more hydrorefining catalysts in one or more different catalytic beds so as to achieve, in the case of the first hydrorefining stage of the two-stage hydrocracking methods, a pre-converting refining operation.

In a preferred embodiment, the catalysts used in the first hydrorefining stage of the two-stage hydrocracking methods are the catalysts described according to the invention.

Hydrotreatment/Hydrorefining of Hydrocarbon-Containing Feeds

The invention also relates to a hydrocarbon feed hydrotreatment method using the catalyst described above, and said hydrotreatment method can be advantageously implemented alone or upstream from a hydrocracking method.

Hydrotreatment and hydrorefining of hydrocarbon feeds such as petroleum cuts, cuts from coal or hydrocarbons produced from natural gas relate to the hydrogenation, hydrodesulfurization, hydrodenitrogenation, hydrodeoxygenation, hydrodearomatization and hydrodemetallation of hydrocarbon feeds containing aromatic and/or olefinic and/or naphthenic and/or paraffinic compounds, said feeds possibly containing metals and/or nitrogen and/or oxygen and/or sulfur.

More particularly, the feeds used in the hydrotreatment methods according to the invention are gasolines, gas oils, vacuum gas oils, atmospheric residues, vacuum residues, atmospheric distillates, vacuum distillates, heavy fuels, oils, waxes and paraffins, spent oils, deasphalted residues or crudes, feeds from thermal or catalytic conversion processes and mixtures thereof. They preferably contain heteroatoms such as sulfur, oxygen and nitrogen and/or at least one metal.

The hydrotreatment method according to the invention advantageously operates at a temperature ranging between 200° C. and 450° C., preferably between 250° C. and 440° C., at a pressure ranging between 1 and 25 MPa, preferably between 1 and 18 MPa, at an hourly space velocity ranging between 0.1 and 20 h$^{-1}$, preferably between 0.2 and 5 h$^{-1}$, and at a hydrogen/feed ratio expressed in volume of hydrogen, measured under normal temperature and pressure conditions, per volume of liquid feed generally ranging between 80 l/l and 5000 l/l, preferably between 100 l/l and 2000 l/l.

In cases where said hydrotreatment method is implemented alone or upstream from a hydrocracking method, the catalyst described according to the invention can be advantageously used in the hydrotreatment reaction zone, in converting pretreatment, alone or in combination with another, conventional hydrotreatment catalyst, arranged upstream from the catalyst described according to the invention, in one or more catalytic bed(s), in one or more reactor(s). The catalyst used in the hydrocracking method implemented downstream from the hydrotreatment method according to the invention can be advantageously identical to or different from the catalyst used in the hydrotreatment method according to the invention.

EXAMPLES

Example 1

Preparation of the Modified Zeolite Used in the Catalyst According to the Invention 100 g dealuminized HY zeolites, of framework Si/Al ratio equal to 11.5 and measured by silicon and aluminium NMR, are exchanged by a NaNO$_3$ solution to obtain the cationic NaY form of the Y zeolite. Exchange is carried out in a flask containing 1 l NaNO$_3$ solution at 80° C. for 2 hours, then the suspension is filtered and the zeolite is dried at 120° C. for one night. The NaY zeolite obtained is poured into a three-neck flask containing 1 l anhydrous toluene and equipped with a cooler. After temperature rise to 60° C., the amount of tetraethylorthosilicate TEOS molecular compound corresponding to 1 wt. % silica is slowly fed into the zeolite suspension using a syringe pump. After stirring for 1 hour, the suspension is filtered and the zeolite dried at 120° C. for one night. The modified zeolite is then exchanged 3 times by a 1N solution of NH$_4$NO$_3$ to obtain the partly exchanged NH$_4^+$ form, the exchange being carried out at a temperature of 80° C. TEOS decomposition and conversion of the NH$_4^+$ cations to protons is achieved under H$_2$O-saturated N$_2$ at 350° C. for 2 hours, then a thermal treatment under pure N$_2$ is conducted at 450° C. for 2 hours. The characterizations of the zeolites measured by atomic adsorption spectroscopy and pyridine adsorption, followed by infrared spectroscopy, are given in Table 1.

Example 2

Preparation of a Modified Zeolite not in Accordance with the Invention 100 g dealuminized HY zeolites, of framework Si/Al ratio equal to 11.5 and measured by silicon and aluminium NMR, are exchanged by a NaNO$_3$ solution to obtain the cationic NaY form of the Y zeolite. Exchange is carried out in a flask containing 1 l NaNO$_3$ solution at 80° C. for 2 hours, then the suspension is filtered and the zeolite is dried at 120° C. for one night. The NaY zeolite obtained is poured into a three-neck flask containing 1 l anhydrous toluene and equipped with a cooler. After temperature rise to 60° C., the amount of tetraethylorthosilicate TEOS molecular compound corresponding to 1 wt. % silica is slowly fed into the zeolite suspension using a syringe pump. After stirring for 1 hour, the suspension is filtered and the zeolite dried at 120° C. for one night. The modified zeolite is then exchanged 2 times by a 1N solution of NH$_4$NO$_3$ to obtain the partly exchanged NH$_4^+$ form, the exchange being carried out under reflux, at a temperature of 100° C. The Na$^+$ contents remaining on the modified zeolite are thus variable and recorded in Table 1. TEOS decomposition and conversion of the NH$_4^+$ cations to protons is achieved under H$_2$O-saturated N$_2$ at 350° C. for 2 hours, then a thermal treatment under pure N$_2$ is conducted at 450° C. for 2 hours. The characterizations of the zeolites measured by atomic adsorption spectroscopy and pyridine adsorption, followed by infrared spectroscopy, are given in Table 1.

TABLE 1

Characterization of the samples

|  | Non modified HY Not in accordance | Modified Y exchanged 2 times Not in accordance | Modified Y exchanged 3 times (in accordance with the invention) |
|---|---|---|---|
| Na/Al | 0.001 | 0.24 | 0.05 |
| Amount of Na+ remaining in relation to the amount of $NH_4^+$ initially present (%) | 0.1 | 24 | 5 |
| Brønsted acid sites (a.u., band at 1545 $cm^{-1}$) after pyridine desorption at 150° C. | 5.5 | 4.8 | 5.0 |
| Lewis acid sites (a.u., band at 1455 $cm^{-1}$) after pyridine desorption at 150° C. | 3.7 | 1.6 | 1.5 |

What is referred to as non modified HY zeolite not in accordance with the invention is a dealuminized HY zeolite exchanged by a $NH_4NO_3$ solution to obtain the cationic form of the Y zeolite, but which has not been modified according to the modification method described in the invention.

The analytical results show that the amount of Brønsted acid sites slightly decreases and that the amount of Lewis acid sites greatly decreases on the modified zeolites. This acidity variation varies in inverse proportion to the amount of sodium present in the samples.

Example 3

Preparation of the Catalysts

The catalyst supports according to the invention containing the zeolites, modified or not, are prepared using 19.5 g zeolite mixed with 80.5 g of a matrix made up of ultrafine tabular boehmite of alumina gel marketed under the trade name SB3 by Condea Chemie GmbH. This powder mixture is then mixed with an aqueous solution containing 66 wt. % nitric acid (7 wt. % acid per gram of dry gel), then kneaded for 15 minutes. The kneaded dough is then extruded through a 1.2-mm diameter die. The extrudates are calcined at 500° C. for 2 hours in air.

The support extrudates thus prepared are dry impregnated with a solution of a mixture of ammonium heptamolybdate and nickel nitrate, and calcined in air at 550° C. in situ in the reactor. The proportions by weight of oxides in the catalysts obtained are given in Table 2.

TABLE 2

Characteristics of the catalysts

| Zeolite constituents of the catalyst | Non-modified HY | Modified Y exchanged 2 times Not in accordance | Modified Y exchanged 3 times In accordance with the invention |
|---|---|---|---|
| $MoO_3$ (wt. %) | 12.1 | 12.4 | 12.3 |
| NiO (wt. %) | 3.2 | 3.1 | 3.0 |
| $SiO_2$ (wt. %) global | 14.7 | 14.1 | 14.1 |
| 100% complement (predominantly consisting of $Al_2O_3$ (wt. %) | 70.0 | 70.4 | 70.6 |

Example 4

Comparison of Catalysts Used for Single-Stage Hydrocracking of a Vacuum Distillate The catalysts whose preparation is described in the above examples are used under high-conversion hydrocracking conditions (60-100%). The petroleum feed is a vacuum distillate hydrotreated on an industrial catalyst based on nickel/molybdenum on alumina of HRK558 type whose main characteristics are given in Table 3.

No intermediate separation stage is performed between the preliminary hydrorefining stage and the hydrocracking stage.

TABLE 3

Characteristics of the hydrotreated feed used

| Density (20/4) | 0.869 |
|---|---|
| Sulfur (wt.-ppm) | 502 |
| Nitrogen (wt.-ppm) | 10 |
| Simulated distillation | |
| initial point | 298° C. |
| 10% point | 369° C. |
| 50% point | 427° C. |
| 90% point | 481° C. |
| end point | 538° C. |

0.6 wt. % aniline and 2 wt. % dimethyl-disulfide are added to the hydrotreated feed in order to simulate the $H_2S$ and $NH_3$ partial pressures present in the hydrocracking stage. The feed thus prepared is injected into the hydrocracking test unit that comprises a fixed-bed reactor, with up-flow circulation of the feed, wherein 80 ml catalyst are fed. The catalyst is sulfurized by a n-hexane/DMDS+aniline mixture up to 320° C. It can be noted that any in-situ or ex-situ sulfurization method is suitable. Once sulfurization achieved, the feed described in Table 3 can be converted. The operating conditions of the test unit are given in Table 4.

TABLE 4

Catalysts test conditions

| Total pressure | 9 MPa |
|---|---|
| Catalyst | 80 cm³ |
| Hydrogen flow rate | 80 L/h |
| Feed flow rate | 80 cm³/h |

The catalytic performances are expressed by the temperature that allows to reach a gross conversion level of 70% and by the gasoline and jet fuel (kerosene) yields. These catalytic performances are measured on the catalyst after a stabilization period of generally less than 48 hours.

The gross conversion GC is taken to be:

GC=wt. % of 380° C. minus effluent with "380° C. minus" representing the fraction distilled at a temperature lower than or equal to 380° C.

The jet fuel (kerosene, 150-250, see kerosene yield below) yield is equal to the proportion by weight of compounds having a boiling point ranging between 150° C. and 250° C. in the effluents. The diesel yield (250-380) is equal to the proportion by weight of compounds having a boiling point ranging between 250° C. and 380° C. in the effluents.

The reaction temperature is set so as to reach a gross conversion GC equal to 70 wt. %. In Table 5, we give the reaction temperature and the light and middle distillate yields for the catalysts described in the above examples.

TABLE 5

Catalytic activities of the hydrocracking catalysts

| | T(° C.) | Kerosene yield (wt. %) | Diesel fuel yield (wt. %) |
|---|---|---|---|
| Non-modified HY | 385 | 21.2 | 16.3 |
| Modified Y exchanged 2 times (not in accordance) | 386 | 21.4 | 16.4 |
| Modified Y exchanged 3 times (in accordance with the invention) | 383 | 21.9 | 17.1 |

The method according to the invention shows that the catalyst containing a modified zeolite according to the invention and used in said method of the invention is more active and leads to use a lower temperature than the catalysts that are not in accordance in order to obtain a conversion level of 70 wt. % of the 380° C.+ fraction while allowing to obtain higher middle distillate yields, and therefore a better middle distillate selectivity in relation to a hydrocracking method using a catalyst that is not in accordance and containing a zeolite, either non modified or modified under conditions not in accordance with the invention.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The entire disclosures of all applications, patents and publications, cited herein and of corresponding French application No. 09/04.911, filed Oct. 13, 2009, are incorporated by reference herein.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A hydrocracking and/or hydrotreatment method, comprising catalyzing said method with a catalyst that comprises an active phase containing at least one hydro-dehydrogenizing element which is a VIB or non-noble group VIII element of the periodic table, alone or in an admixture, and a support comprising at least one zeolite modified according to a modification method comprising at least a) a stage of introducing at least one alkaline cation belonging to groups IA or IIA of the periodic table, b) a stage of treating said zeolite in the presence of at least one molecular compound containing at least one silicon atom, c) at least one stage of partial exchange of the alkaline cations by $NH_4^+$ cations in such a way that the proportion of alkaline cations remaining in the modified zeolite at the end of stage c) is such that the alkaline cation/aluminium molar ratio ranges between 0.2:1 and 0.01:1, and d) at least one thermal treatment stage, said zeolite having, prior to being modified, at least one series of channels whose opening is defined by a ring with 12 oxygen atoms (12MR), said catalyst being a sulfide phase catalyst.

2. A method as claimed in claim 1, wherein the group VIB element is tungsten or molybdenum, alone or in an admixture.

3. A method as claimed in claim 1, wherein the non-noble group VIII element is cobalt or nickel, alone or in an admixture.

4. A method as claimed in claim 1, wherein said catalyst comprises at least one group VIB metal in combination with at least one non-noble group VIII metal, the proportion of group VIB metal is, in oxide equivalent, between 5 and 40 wt. % in relation to the total mass of said catalyst, and the proportion of non-noble group VIII metal is, in oxide equivalent, between 0.5 and 10 wt. % in relation to the total mass of said catalyst.

5. A method as claimed in claim 1, wherein the zeolite prior to being modified was a Y zeolite.

6. A method as claimed in claim 1, wherein the alkaline cation belonging to groups IA and IIA introduced in stage a) is $Na^+$, $Li^+$, $K^+$, $Rb^+$, $Cs^+$, $Ba^{2+}$ or $Ca^{2+}$.

7. A method as claimed in claim 1, wherein the molecular compound containing at least one silicon atom is tetraethylorthosilicate (TEOS) of formula $Si(OCH_2CH_3)_4$.

8. A method as claimed in claim 1, wherein the proportion of alkaline cations remaining in the modified zeolite at the end of stage c) is such that the alkaline cation/aluminium molar ratio is between 0.2:1 and 0.015:1.

9. A method as claimed in claim 1, wherein the temperature of exchange stage c) is between 60° C. and 85° C.

10. A method as claimed in claim 1, which hydrocracking and/or hydrotreatment method operates in the presence of hydrogen, at a temperature above 200° C., at a pressure above 1 MPa, at a space velocity between 0.1 and 20 h$^{-1}$, and wherein the amount of hydrogen introduced is such that the volume ratio of liter of hydrogen to liter of hydrocarbon is between 80 and 5000 l/l.

11. A method as claimed in claim 1, wherein a hydrocarbon-containing feed is hydrocracked and/or hydrotreated, which is a light cycle oil from a catalytic cracking unit, an atmospheric distillate, a vacuum distillate, a feed from a lube oil base aromatics extraction unit or from lube oil base solvent-dewaxing, a distillate from ATR (atmospheric residue) and/or VR (vacuum residue) and/or deasphalted oil fixed-bed or ebullated-bed desulfurization or hydroconversion process, or deasphalted oil, alone or in an admixture.

12. A method as claimed in claim 1, which hydrocracking and/or hydrotreatment method is implemented in a single-stage method.

13. A method as claimed in claim 12, wherein the catalyst is in a hydrocracking zone arranged downstream from a hydrorefining zone, no intermediate separation being provided between the hydrocracking and hydrorefining zones.

14. A method as claimed in claim 1, which hydrocracking and/or hydrotreatment method is implemented in a two-stage method.

15. A method as claimed in claim 14, wherein the catalyst is in a second hydrocracking stage downstream from a first hydrorefining stage, an intermediate separation being provided between the second hydrocracking stage and the first hydrorefining stage.

16. A method as claimed in claim 1, wherein the alkaline cation belonging to groups IA and IIA introduced in stage a) is Na+.

17. A method as claimed in claim 9, wherein exchange stage c) is performed in two stages.

18. A method as claimed in claim 9, wherein exchange stage c) is performed in three stages.

* * * * *